US008660354B2

(12) United States Patent
Matsuguma et al.

(10) Patent No.: US 8,660,354 B2
(45) Date of Patent: Feb. 25, 2014

(54) IMAGE PROCESSING APPARATUS INCLUDING AN OBTAINING UNIT, AN ISOLATING UNIT, A CLASSIFYING UNIT, INFORMATION PROCESSING APPARATUS, AND IMAGE READING APPARATUS

(75) Inventors: Chihiro Matsuguma, Ebina (JP); Hiroyoshi Uejo, Ebina (JP); Kazuhiro Ohya, Ebina (JP); Ayumi Onishi, Ebina (JP); Katsuya Koyanagi, Ebina (JP); Hiroshi Niina, Ebina (JP); Zhenrui Zhang, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1178 days.

(21) Appl. No.: 12/573,250

(22) Filed: Oct. 5, 2009

(65) Prior Publication Data

US 2010/0232717 A1 Sep. 16, 2010

(30) Foreign Application Priority Data

Mar. 16, 2009 (JP) ................................. 2009-063483

(51) Int. Cl.
*G06K 9/34* (2006.01)
*G06K 9/62* (2006.01)

(52) U.S. Cl.
USPC ............................ 382/177; 382/164; 382/224

(58) Field of Classification Search
USPC .......................................... 382/224, 177, 164
See application file for complete search history.

(56) References Cited

U.S. PATENT DOCUMENTS

| 2002/0012465 | A1 | 1/2002 | Fujimoto et al. | |
| 2005/0180647 | A1* | 8/2005 | Curry et al. | 382/243 |
| 2008/0205759 | A1* | 8/2008 | Zandifar et al. | 382/177 |
| 2010/0054585 | A1* | 3/2010 | Guillou et al. | 382/164 |

FOREIGN PATENT DOCUMENTS

| JP | 06-111060 A | 4/1994 |
| JP | 2005-317042 A | 11/2005 |
| JP | 2007-129557 A | 5/2007 |
| JP | 2008-269502 A | 11/2008 |
| WO | 00/62243 A1 | 10/2000 |

OTHER PUBLICATIONS

Japanese Office Action dated Mar. 22, 2011 for corresponding Japanese Application No. 2009-063483.

* cited by examiner

*Primary Examiner* — Kathleen Y Dulaney
(74) *Attorney, Agent, or Firm* — Sughrue Mion, PLLC

(57) ABSTRACT

An image processing apparatus includes: a memory; an obtaining unit that obtains image data representing an image including concatenated pixels; an isolating unit that isolates a rendering element, the rendering element being an image surrounded by border lines of a color in an image represented by the image data; and a classifying unit that, in a case where a plurality of rendering elements has been isolated by the isolating unit, and in a case where color difference between two of the plural rendering elements or the distance between the two rendering elements is less than a threshold, classifies the two rendering elements into the same group, associates pieces of image data that represent rendering elements belonging to the same group with one another, and stores the pieces of image data in the memory.

2 Claims, 7 Drawing Sheets

FIG. 4
| RANK | CLASSIFICATION CONDITION |
|---|---|
| 1 | COLORS ARE THE SAME |
| 2 | EXPANDED CIRCUMSCRIBING RECTANGLES OVERLAP WITH ONE ANOTHER |
FIG. 5A
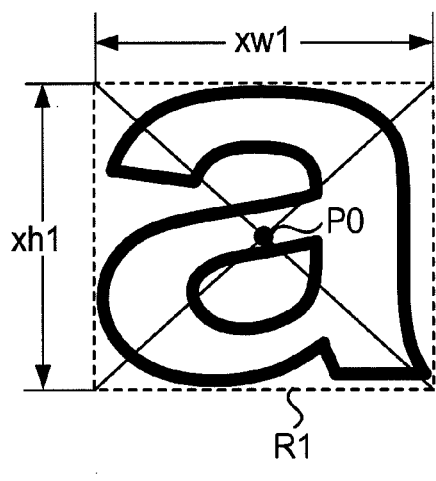
FIG. 5B
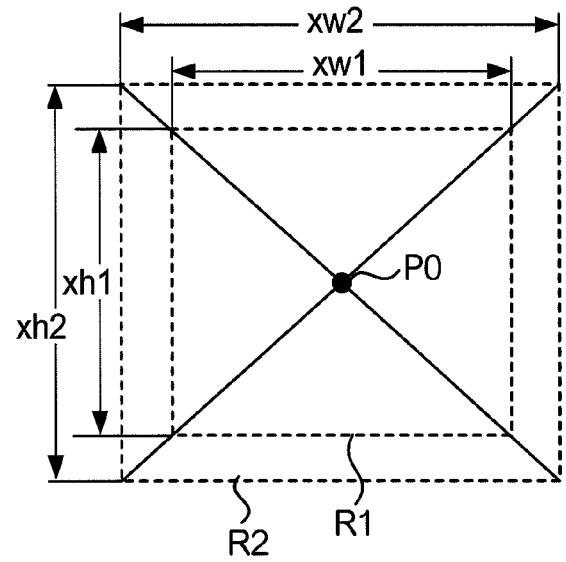

FIG. 11A

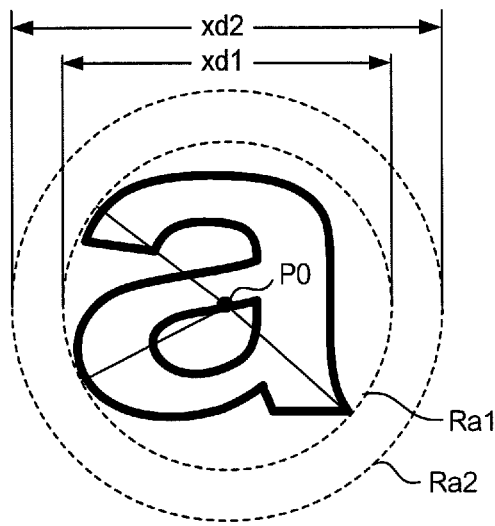

FIG. 11B

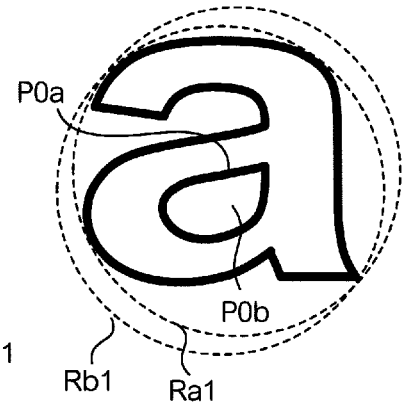

FIG. 12

| DETERMINATION TARGET | TYPE | CLASSIFICATION CONDITION EXAMPLE |
|---|---|---|
| LOCATION (DISTANCE) | RELATIVE CONDITION | EXPANDED CIRCUMSCRIBING RECTANGLES OVERLAP WITH ONE ANOTHER<br>NUMBER OF OVERLAPPING PIXELS IN EXPANDED CIRCUMSCRIBING RECTANGLES IS NO LESS THAN 5<br>INTER-ELEMENT DISTANCE IS NO GREATER THAN 120% OF THE SIZE OF THE SMALLER ELEMENT |
| | ABSOLUTE CONDITION | EXPANDED CIRCUMSCRIBING RECTANGLE IS WITHIN A PRE-DIVIDED REGION |
| COLOR | RELATIVE CONDITION | COLOR DIFFERENCE IS WITHIN 5%<br>LUMINOSITY IS THE SAME<br>TWO OR MORE COMPOSITION COLORS ARE THE SAME |
| | ABSOLUTE CONDITION | COLOR SATURATION IS NO LESS THAN 50% AND UNDER 70%<br>CONTRAST BETWEEN BACKGROUND COLOR AND FOREGROUND COLOR IS NO LESS THAN 30%<br>RGB VALUES OF COLOR ARE WITHIN A PRE-DIVIDED REGION |

IMAGE PROCESSING APPARATUS INCLUDING AN OBTAINING UNIT, AN ISOLATING UNIT, A CLASSIFYING UNIT, INFORMATION PROCESSING APPARATUS, AND IMAGE READING APPARATUS

CROSS-REFERENCE TO RELATED APPLICATIONS

This application claims priority under 35 USC 119 from a Japanese patent application No. 2009-063483 filed on Mar. 16, 2009.

BACKGROUND

1. Technical Field

The present invention relates to an image processing apparatus, an information processing apparatus, and an image reading apparatus.

2. Related Art

As a system by which a computer represents image data, there is a system, called the vector system, that represents concatenated components representing line segments, surface regions, text, and the like included in an image as numerical values or numerical formulas. With image data represented using this system, processes that move or delete concatenated components on a component-by-component basis are possible, and parts of such image data are suited to reuse.

SUMMARY

An aspect of the present invention provides a technique for classifying images composed of concatenated pixels into groups made up of rendering elements included in those concatenated components, and handling those rendering elements on a group-by-group basis.

According to one aspect of the invention, there is provided an image processing apparatus including: a memory; an obtaining unit that obtains image data representing an image including concatenated pixels; an isolating unit that isolates a rendering element, the rendering element being an image surrounded by border lines of a color in an image represented by the image data; and a classifying unit that, in a case where a plurality of rendering elements has been isolated by the isolating unit, and in a case where color difference between two of the plural rendering elements or the distance between the two rendering elements is less than a threshold, classifies the two rendering elements into the same group, associates pieces of image data that represent rendering elements belonging to the same group with one another, and stores the pieces of image data in the memory.

BRIEF DESCRIPTION OF THE DRAWINGS

An exemplary embodiment of the present invention will be described in detail based on the following figures, wherein:

FIG. 4 is an example of a table of classification conditions obtained from a RAM;

FIG. 5A shows diagrams illustrating an expanded circumscribing rectangle;

FIG. 5B shows diagrams illustrating an expanded circumscribing rectangle;

FIG. 11A shows diagrams illustrating the representation of a region in which a rendering element is rendered, using a circumscribing circle;

FIG. 11B shows diagrams illustrating the representation of a region in which a rendering element is rendered, using a circumscribing circle; and FIG. 12 shows a diagram illustrating an example of classification conditions.

DETAILED DESCRIPTION

1. Definitions

Figure 1:
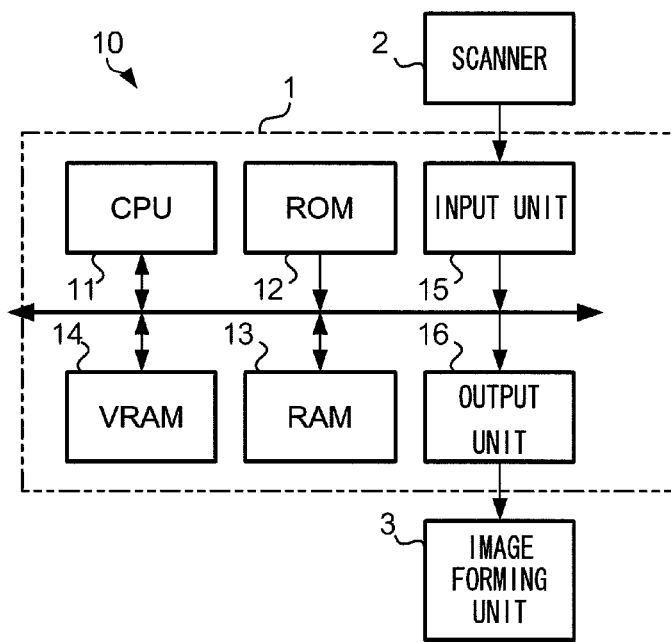
FIG. 1 shows a block diagram illustrating the overall configuration of an image processing apparatus.

In the following exemplary embodiment, "image region" refers to a region within an image in which a picture is rendered.

"Raster system" refers to a system in which an image is divided into units called pixels, arranged in grid form, and color information (hue, tone, and so on) represented by each of those pixels is denoted on a pixel-by-pixel basis.

"Raster image" refers to an image represented by the raster system.

"Resolution" refers to a value, in a raster image, showing the number of pixels disposed per unit length. Here, the unit length is, for example, the inch, and in such a case, the unit of resolution is "dpi (dot per inch)", which shows the number of pixels per inch.

"Vector information" is information in which each of the elements, such as lines, surface regions, text, and so on, that are to be rendered are defined within an abstract space, and the processes for rendering each element are denoted as numerical values or numerical formulas. Parameters such as, for example, Bezier curves are used to denote this vector information.

"Vector system" refers to a system by which elements defined using vector information are rendered on an element-by-element basis. To be more specific, the vector system is a system in which the coordinates of the origin and end points, the color, the width, curvatures, and so on of a line, the colors of surfaces enclosed by lines, character codes and character attributes (size and font), and so on are represented as numerical values and numerical formulas.

"Vector image" refers to an image represented by the vector system.

"Rasterizing" refers to converting a vector image into a raster image. If the size and resolution of an image are set, rasterizing can be performed by setting the color information of each pixel in accordance with rendering information included within the vector image.

"Vectorizing" refers to converting a raster image into a vector image.

"Concatenated component" refers to the result of concatenating pixels that have identical values, thereby forming a single cluster, in a binary image corresponding to an image.

"Rendering color" refers to a color in which a rendering target in an image is rendered.

"Non-rendering color" refers to a color that is not a rendering color.

"Foreground color" refers to a rendering color, set for each rendering target, that is to be rendered within concatenated components that make up a rendering target.

"Background color" refers to a rendering color that is to be rendered immediately outside of concatenated components that make up a rendering target.

For the sake of simplicity, the color pixel values are assumed to be represented as RGB values, where three colors have 256 tones. "RGB values" represent the strengths of three base colors, or red (R), green (G), and blue (B), in that order, as two-digit hexadecimals (in other words, 256 tones, from 00 to ff), and indicate colors obtained when making addictive color mixtures of these three base colors having these tones. For example, red is represented as (ff, 00, 00), whereas yellow is represented as (ff, ff, 00).

2. Configuration

The configuration of an image processing apparatus 10, serving as an exemplary embodiment of the present invention, shall now be described.

FIG. 1 shows a block diagram illustrating the overall configuration of the image processing apparatus 10. As shown in FIG. 1, the image processing apparatus 10 includes an information processing unit 1, a scanner 2, and an image forming unit 3. The area surrounded by the double-dot-dash line shown in FIG. 1 indicates the information processing unit 1. A CPU (Central Processing Unit) 11 controls the various units in the information processing unit 1 by reading out and executing a computer program (called simply a "program" hereinafter) stored in a ROM (Read Only Memory) 12. For example, the CPU 11 functions as an image region dividing unit, a vector information generation unit, and so on, which will be described later. The ROM 12 is a read-only non-volatile storage device configured of a semiconductor element or the like. Various programs, a BIOS (Basic Input/Output System), and so on are stored in the ROM 12. A RAM (Random Access Memory) 13 is used as a working area when the CPU 11 executes programs. Furthermore, the RAM 13 includes a region for storing data representing vector images (called "vector image data" hereinafter) and data representing raster images (called "raster image data" hereinafter). Note that a data compression process may be executed on this data that represents images. A VRAM (Video RAM) 14 is a RAM that stores raster image data. An input unit 15 serves as an interface with an external input apparatus, such as a scanner, a computer, or the like, and receives image data under the control of the CPU 11. Here, the input unit 15 receives raster image data inputted from the scanner 2. An output unit 16 outputs image data to the image forming unit, an external device such as a liquid-crystal display medium, or the like, under the control of the CPU 11. Here, the output unit 16 outputs image data to the image forming unit 3. The various units within the information processing unit 1 are connected to one another via a bus.

Figure 2:
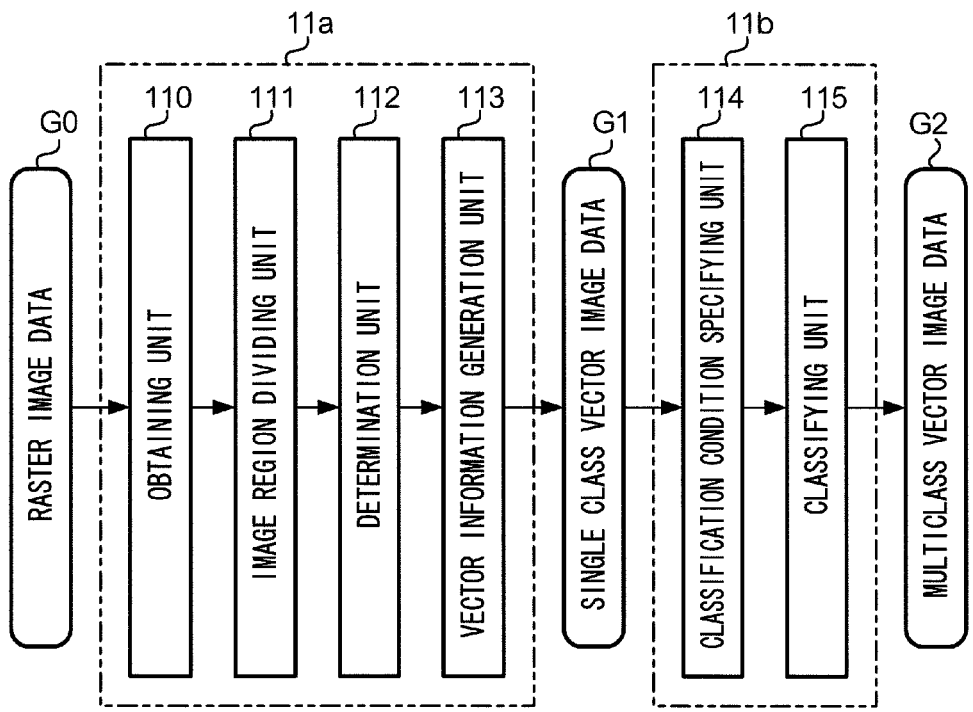
FIG. 2 shows a block diagram illustrating the functional configuration of an information processing unit.

FIG. 2 shows a block diagram illustrating the functional configuration of the information processing unit 1. The units surrounded by the double-dot-dash frames 11a and 11b in FIG. 2 represent functions implemented by the CPU 11 of the information processing unit 1. Raster image data G0 is obtained by an obtaining unit 110 and is divided into image regions by an image region dividing unit 111. Here, details of the functions of the image region dividing unit 111 will be described using a specific example.

Figure 3:
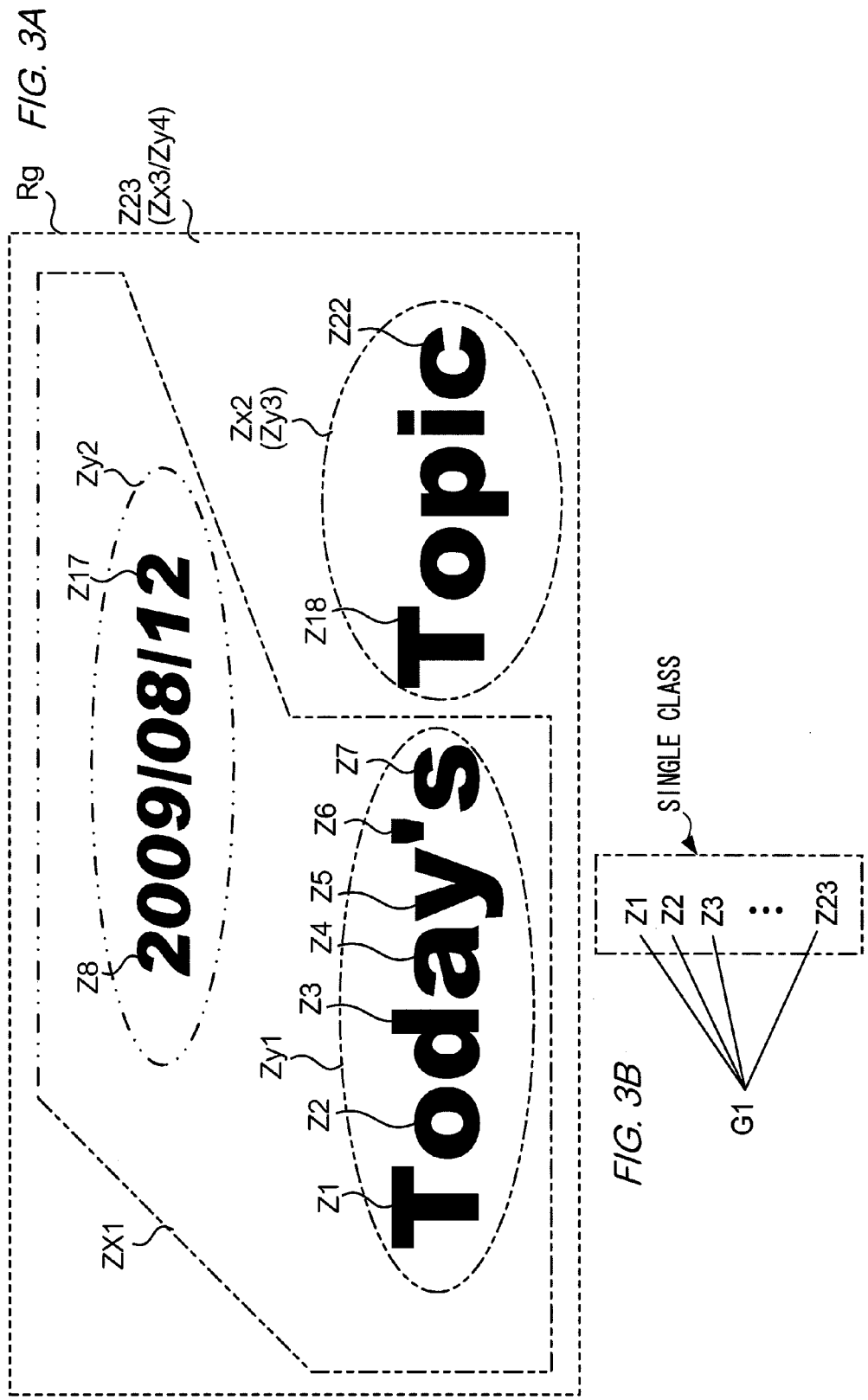
FIG. 3A shows diagrams conceptually illustrating an example of a processed image and the storage state of image data.
FIG. 3B shows diagrams conceptually illustrating an example of a processed image and the storage state of image data.

FIG. 3A shows a diagram illustrating an example of an image processed by the information processing unit 1. In FIG. 3A, character strings "2009/08/12" and "Today's" are rendered in blue (00, 00, ff) and a character string "Topic" is rendered in red (ff, 00, 00) within a rectangle Rg indicated by a dotted line, whereas the regions within the rectangle Rg but excluding those character strings are rendered in light blue (00, ff, ff). The outside of the rectangle Rg is white (ff, ff, ff). This image is captured by the scanner 2 as the raster image data G0. When the CPU 11, functioning as the obtaining unit 110, obtains this image data, the CPU 11, functioning as the image region dividing unit 111, compares the pixel values of each pixel in that image with a predetermined threshold (for example, (fe, fe, fe) or the like) for each of the three primary colors. Then, the image region dividing unit 111 separates these pixels into two classes, namely "pixels in which all of the R, G, and B values exceed the threshold" and "pixels in which any one of the R, G, and B values does not exceed the threshold", and performs a binarization process that determines the pixel values of the former to be non-rendering colors and the pixel values of the latter to be rendering colors.

For example, because white, on the outside of the rectangle Rg, is made up of "pixels in which all of the R, G, and B values exceed the threshold", that white is determined to be a non-rendering color as a result of the binarization process. Meanwhile, because light blue, on the inside of the rectangle Rg, is made up of "pixels in which any one of the R, G, and B values does not exceed the threshold" (in this case, the value R (=00) does not exceed the threshold (=fe)), that light blue is determined to be a rendering color as a result of the binarization process. The CPU 11, functioning as the image region dividing unit 111, isolates concatenated components including concatenated pixels with this rendering color, and cuts out the rectangle that circumscribes these concatenated components from the raster image data as an image region. Here, the rectangle Rg is cut out as the image region.

A determination unit 112 determines whether the image region cut out by the image region dividing unit 111 is to be to vectorized. The determination unit 112 performs the stated determination based on the results of comparing the number of rendering colors that are rendered in that image region, the number of times the rendering colors of concatenated pixels within that image region change, and so on with preset thresholds. The vector information generation unit 113 then vectorizes the image region determined by the determination unit 112 to be vectorized, and outputs single class vector image data G1 corresponding to that image region.

Here, the vectorization process performed by the vector information generation unit 113 and the single class vector image data G1 outputted as a result thereof will be described. The CPU 11, functioning as the vector information generation unit 113, first analyzes portions of the raster image data G0 that correspond to the image region determined to be vectorized, and stores the color of the pixel on the outermost side of the image region in the RAM 13 as the background color. The CPU 11 then specifies a region surrounded by the border lines between the background color and a rendering color that is not the background color (in other words, the foreground color) as rendering elements, and generates vector information in which the processes for rendering these rendering elements are denoted as numerical values or numerical formulas. After generating this vector information for all the rendering elements within this image region, the CPU 11 stores that vector information in the RAM 13 collectively as the single class vector image data G1.

With the image illustrated in FIG. 3A, the color rendered on the outermost side of the rectangle Rg is light blue, and thus light blue (00, ff, ff) is stored in the RAM 13 as the background color. Meanwhile, there are 23 regions surrounded by border lines between light blue and colors that are not light blue (that is, rendering colors and non-rendering colors), including the region in which the background color is rendered, and therefore the CPU 11 specifies 23 rendering elements. Here, to simplify the descriptions, these rendering elements are represented by reference numerals including suffixes, or Z1, Z2, and so on up to Z23. For example, the "T" at the beginning of "Today's" is a rendering element Z1, the "o" to the right thereof in FIG. 3A shows a rendering element Z2, and the "s" at the end thereof is a rendering element Z7. FIG. 3B shows a diagram conceptually illustrating the storage state of the single class vector image data G1 in the RAM 13. As shown in FIG. 3B, these 23 rendering elements have no associations among rendering elements, no multiple classes by which the rendering elements are divided, or the like; all of the rendering elements are stored as a single class.

A classification condition specifying unit 114 is a unit that obtains, from the RAM 13, a table in which multiple classification conditions are held with a rank given to each thereof, and specifies classification conditions in order based on those ranks; the classification condition specifying unit 114 is implemented by the CPU 11. FIG. 4 shows an example of the table of classification conditions obtained from the RAM 13. As shown in FIG. 4, the classification condition in this table that has the rank "1" is "colors are the same", and the classification condition that has the rank "2" is "expanded circumscribing rectangles overlap with one another".

Here, "expanded circumscribing rectangles" will be described in detail. FIGS. 5A and 5B show diagrams illustrating an expanded circumscribing rectangle. As shown in FIG. 5A, when a character "a" is rendered on plane coordinates, the CPU 11 generates a circumscribing rectangle R1, which is a rectangle that follows the plane coordinates that circumscribe that character. The width of this circumscribing rectangle R1 is denoted as $xw1$, whereas the height of the circumscribing rectangle R1 is denoted as $xh1$. The point at which the diagonal lines within the circumscribing rectangle R1 intersect is denoted as P0. Next, the CPU 11 generates an expanded circumscribing rectangle R2, in which the specified circumscribing rectangle R1 is expanded by a predetermined percentage central to the point P0. The percentage used during this expansion is preset, by a program executed by the CPU 11, to kh in the height direction and kw in the width direction. Therefore, when the width of the expanded circumscribing rectangle R2 is denoted as $xw2$ and the height of the expanded circumscribing rectangle R2 is denoted as $xh2$, $xw2=kw \times xw1$, and $xh2=kh \times xh1$. In this example, $kh=kw=1.2$. In other words, a rectangle in which the circumscribing rectangle R1 has been expanded by 120% central to the point P0 corresponds to the expanded circumscribing rectangle R2. Note that the height and width percentages may be different. Furthermore, the expanded circumscribing rectangle R2 may be generated by expanding the contour lines of the circumscribing rectangle R1 by a predetermined number of pixels, rather than using a percentage.

A classifying unit 115 is a unit that classifies rendering elements into one or multiple groups based on classification conditions specified by the classification condition specifying unit 114, and is implemented by the CPU 11. Through this classification, multiclass vector image data G2, which has classes, is generated from the single class vector image data G1.

3. Operations

Figure 6:
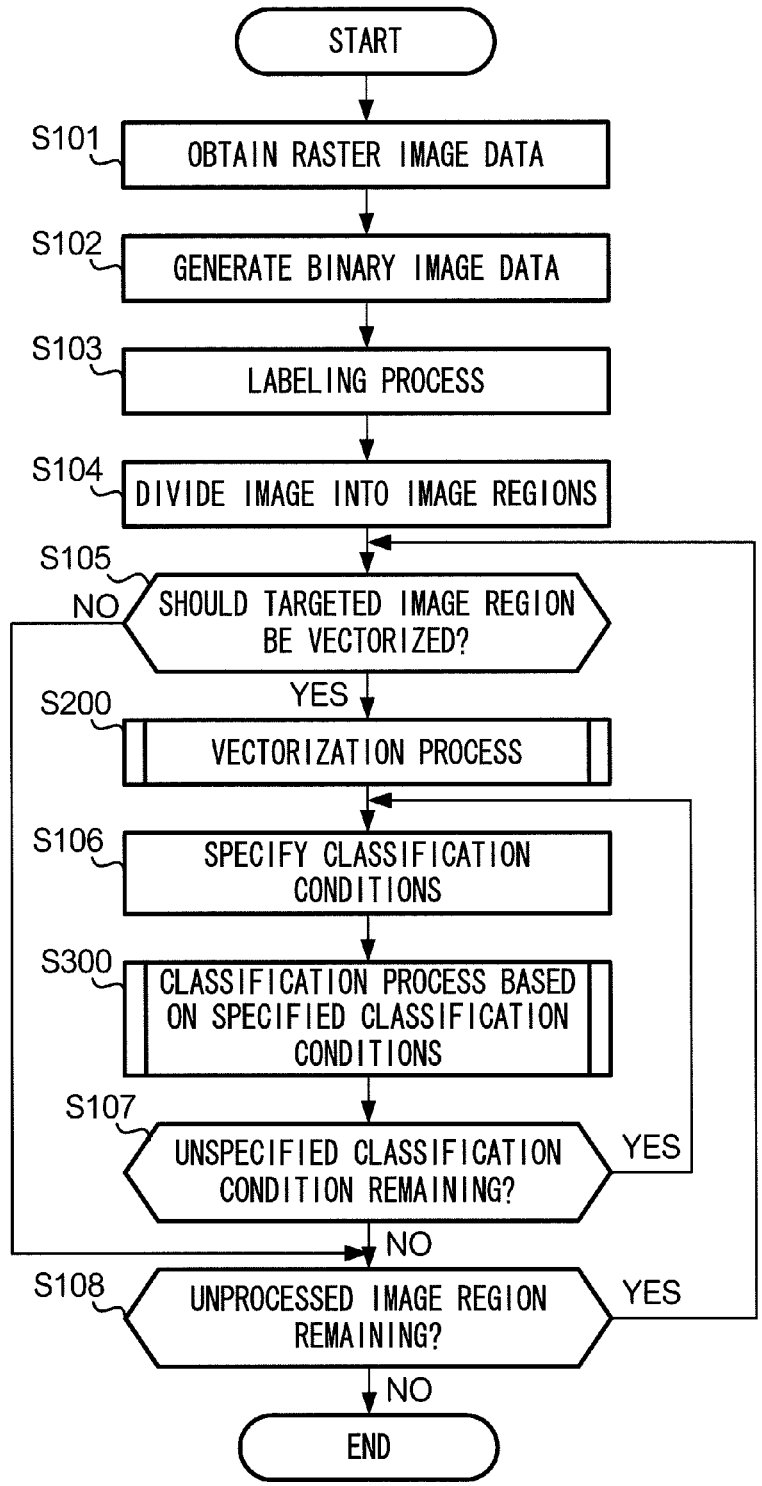
FIG. 6 shows a flowchart illustrating the flow of operations performed by a CPU in the information processing unit.

The operations of the image processing apparatus 10, serving as an exemplary embodiment of the present invention, shall now be described. FIG. 6 shows a flowchart illustrating the flow of operations performed by the CPU 11 in the information processing unit 1. First, raster image data G0 sent from the scanner 2 is received by the input unit 15, and is inputted to the CPU 11 via the bus. In other words, the CPU 11 obtains raster image data G0 and temporarily stores that data in the RAM 13 (step S101). Next, the CPU 11 compares each pixel in the obtained raster image data to a predetermined threshold, and generates binary image data composed of two values, indicating pixels that exceed the threshold, and pixels that do not exceed the threshold (step S102). Then, the CPU 11 adds a label to, from among "pixels that exceed the threshold", pixels adjacent to each other based on the binary image data generated in step S102, and performs a labeling process (step S103). Next, the CPU 11 divides the image, based on the results of the labeling process, into rectangles that circumscribe groups of pixels that have the same label (called "concatenated components" in the field of image processing), or in other words, into image regions (step S104). Note that the CPU 11 functions as the obtaining unit 110 when performing the processing of the step S101, and functions as the image region dividing unit 111 when performing the processing of the steps S102, S103, and S104.

Once the image has been divided into image regions in step S104, the CPU 11 commences sequential processes for one or more of the image regions into which the image has been divided. First, the CPU 11 determines whether a targeted image region is to be vectorized (step S105). In other words, the CPU 11 functions as the determination unit 112 when performing the process of step S105. Here, if it has been determined that the targeted image region is not to be vectorized (step S105; NO), the CPU 11 advances the processing to step S108. However, if it has been determined that the targeted image region is to be vectorized (step S105; YES), the CPU 11 performs a vectorization process on the raster image data G0 corresponding to that targeted image region (step S200). The CPU 11 functions as the vector information generation unit 113 when performing this vectorization process; the targeted image region is vectorized through this vectorization process, and single class vector image data G1 is stored in the RAM 13 as a result. Next, the CPU 11 obtains the table that includes the multiple classification conditions, to each of which a rank has been added, from the RAM 13, sequentially specifies classification conditions in accordance with those ranks (step S106), and performs a classification process based on the specified classification conditions (step S300). In other words, the CPU 11 functions as the classification condition specifying unit 114 when performing the process of step S106, and functions as the classifying unit 115 when performing the process of step S107. Once rendering elements have been classified based on the specified classification conditions, the CPU 11 determines whether or not unspecified classification conditions still remain (step S107). If it has been determined that unspecified classification conditions still remain (step S107; YES), the CPU 11 returns the processing to step S106. However, if it has been determined that no unspecified classification conditions still remain (step S107; NO), the CPU 11 advances the processing to step S108.

In step S108, the CPU 11 determines whether an unprocessed image region still remains. If it has been determined that an unprocessed image region still remains (step S108; YES), the CPU 11 returns the processing to step S105, whereas if it has been determined that no unprocessed image regions remain (step S108; NO), the processing ends.

For example, in the exemplary image shown in FIG. 3A, the "Today's" composed of the rendering elements Z1 to Z7 and the "2009/08/12" composed of the rendering elements Z8 to Z17 both have a foreground color of blue, whereas the "Topic" composed of the rendering elements Z18 to Z22 has a foreground color of red. Therefore, the rendering elements are classified into 3 groups based on the classification condition "colors are the same", whose rank, as shown in the example in FIG. 4, is "1". In other words, the rendering elements are classified into 3 groups: the rendering elements Z1 to Z17, where the foreground color, serving as a rendering color, is blue; the rendering elements Z18 to Z22, where the foreground color, serving as a rendering color, is red; and the rendering element Z23, where the background color, serving as a rendering color, is light blue. The CPU 11 then stores, in order, the groups of rendering elements classified in this manner in the RAM 13 as groups Zx1, Zx2, and Zx3. To be more specific, the CPU 11 associates pieces of image data representing rendering elements belonging to these groups and stores those pieces of image data in the RAM 13.

Next, the CPU 11, functioning as the classification condition specifying unit 114, specifies the classification condition "expanded circumscribing rectangles overlap with one another", whose rank is "2". Then, the CPU 11, functioning as the classifying unit 115, further classifies, into new groups, the rendering elements classified into groups earlier.

Figures 7A, 7B, 8:
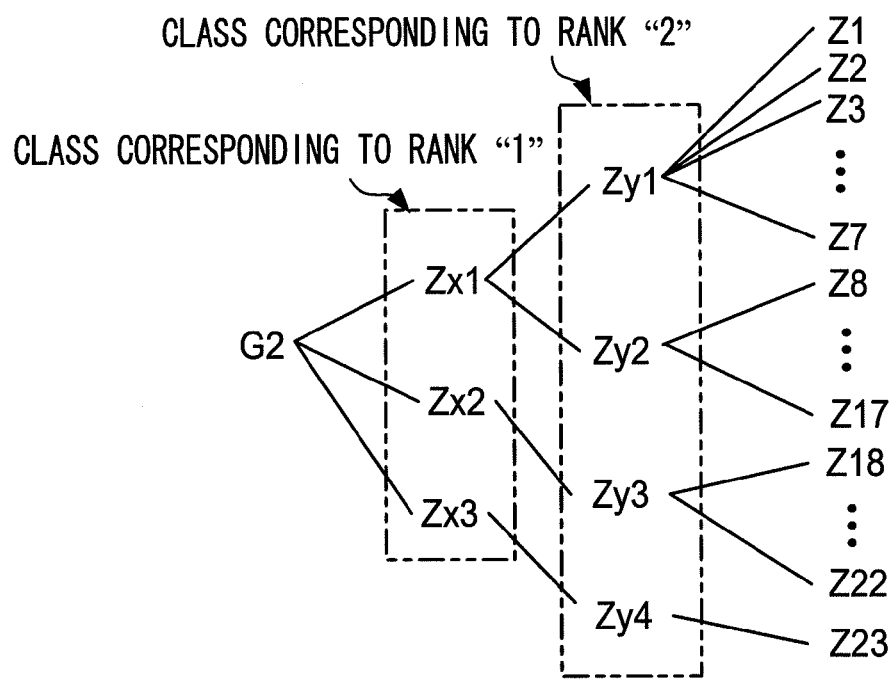
FIG. 7A shows diagrams illustrating circumscribing rectangles and expanded circumscribing rectangles generated for each of rendering elements.
FIG. 7B shows diagrams illustrating circumscribing rectangles and expanded circumscribing rectangles generated for each of rendering elements.
FIG. 8 is a diagram conceptually illustrating the storage state of post-classification multiclass vector image data.

FIGS. 7A and 7B show diagrams illustrating the generation of circumscribing rectangles and expanded circumscribing rectangles for each of the rendering elements Z1 to Z7 shown in the example of FIG. 3A. As shown in FIG. 7A, the circumscribing rectangles generated for each of the rendering elements Z1 to Z7 do not overlap with one another. However, as shown in FIG. 7B, the expanded circumscribing rectangles obtained by expanding those circumscribing rectangles do overlap with one another. Therefore, the rendering elements Z1 to Z7 are classified into the same group, or a group Zy1, and the pieces of image data that represent those rendering elements are associated with one another and stored in the RAM 13. Here, with two adjacent rendering elements, such as the rendering elements Z1 and Z2, the expanded circumscribing rectangles thereof overlap with one another; however, with two rendering elements that are not adjacent to one another, such as the rendering elements Z1 and Z7, the expanded circumscribing rectangles thereof do not overlap with one another. However, the rendering elements Z2 to Z6, which are arranged between those two rendering elements, meet these classification conditions and are also concatenated, and thus the rendering elements Z1 to Z7 are classified into the same group, or the group Zy1. In a similar manner, the rendering elements Z8 to Z17 are classified into a group Zy2, the rendering elements Z18 to Z22 are classified into a group Zy3, and the rendering element Z23 is classified into a group Zy4.

FIG. 8 shows a diagram schematically illustrating the storage state of the multiclass vector image data G2 after classification has been performed according to all the classification conditions. As can be seen here, in the multiclass vector image data G2, groups Zx1, Zx2, and Zx3 are stored as a class corresponding to the rank "1", whereas groups Zy1, Zy2, Zy3, and Zy4 are stored as a class corresponding to the rank "2", which is below the rank "1". Furthermore, the rendering elements themselves are stored in the rank below the rank "2", as the lowest class.

Conventionally, multiple rendering elements defined through vectorization are all stored in a single class, and therefore, when handling such rendering elements, there is no other option but to handle each rendering element individually. However, in the present exemplary embodiment, the rendering elements are classified, based on classification conditions, into groups belonging to multiple classes, and therefore images (rendering elements) included within a single concatenated component can be handled as the groups into which they are classified. For example, when performing an operation on the group Zy2, the rendering elements Z8 to Z17 can be processed collectively through a single operation. Furthermore, performing an operation on the group Zx1, which belongs to a class that is higher than that of the group Zy2, makes it possible to collectively process the rendering elements Z1 to Z17 through a single operation. Through this, the processing load when an operator collectively processes multiple rendering elements can be reduced.

4. Variations

While an exemplary embodiment of the invention has been described above, the content of that exemplary embodiment can be altered in the following ways. The following variations may also be combined.

Figure 9A:
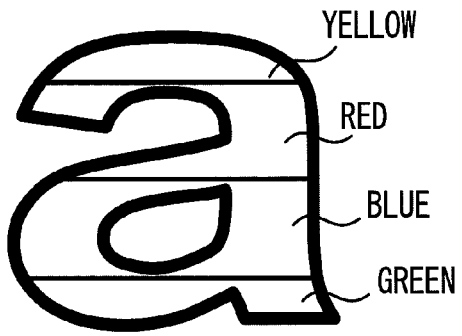
FIG. 9A shows diagrams illustrating an example of rendering elements having multiple foreground colors.
Figure 9B:
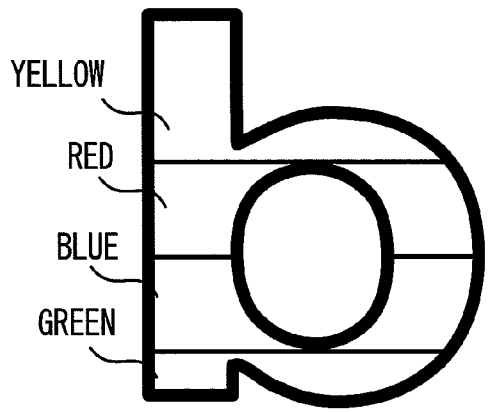
FIG. 9B shows diagrams illustrating an example of rendering elements having multiple foreground colors.
Figure 9C:
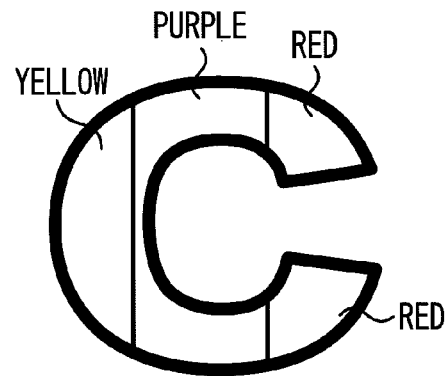
FIG. 9C shows diagrams illustrating an example of rendering elements having multiple foreground colors.

(1) Although only one foreground color was present for each rendering element in the exemplary embodiment described above, each rendering element may have multiple foreground colors. FIGS. 9A, 9B, and 9C show diagrams illustrating an example of rendering elements having multiple foreground colors. The rendering element shown in FIG. 9A is the letter "a", in which four foreground colors have been rendered upon a background color, which is light blue (not shown). These four foreground colors are rendered in respective regions obtained by dividing the character using three parallel border lines that follow the direction in which the text is arranged, and the colors are arranged in an order of yellow, red, blue and green, starting from the top of the diagram. The rendering element shown in FIG. 9B is the letter "b", in which the foreground colors yellow, red, blue, and green are rendered upon a light blue background color. Because the foreground colors themselves, the number of foreground colors, and the order in which those colors are arranged are identical in the rendering element shown in FIG. 9A and the rendering element shown in FIG. 9B, those rendering elements are classified into the same group based on the classification conditions "colors are the same". However, the rendering element shown in FIG. 9C is the character "c", in which three foreground colors are rendered upon a light blue background color; these three foreground colors are rendered in respective regions obtained by dividing the character using two parallel border lines perpendicular to the direction in which the text is arranged, and the colors are arranged in an order of yellow, purple and red, from the left of the diagram. Therefore, the rendering element shown in FIG. 9C is classified into a different group than the rendering element shown in FIG. 9A and the rendering element shown in FIG. 9B based on the classification condition "colors are the same". However, if the classification condition is, for example, "two or more of the colors are the same" rather than "colors are the same", all of the rendering elements have two common colors, or red and yellow, and thus are classified into the same group.

Figure 10A:
FIG. 10A shows diagrams illustrating a process for generating circumscribing rectangles for an identical group.
Figure 10B:
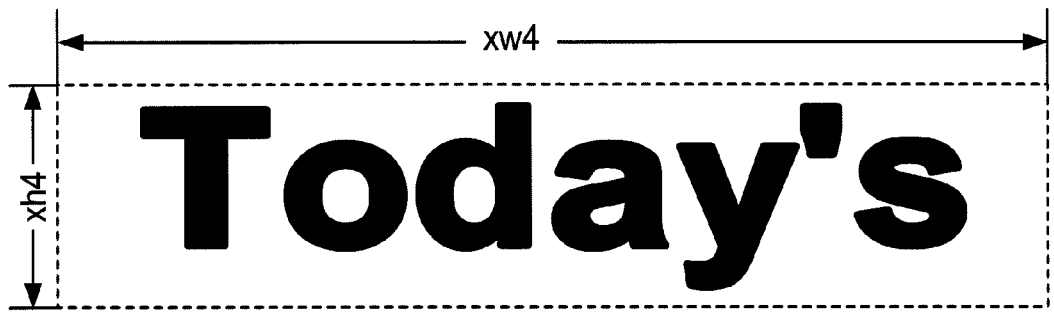
FIG. 10B shows diagrams illustrating a process for generating circumscribing rectangles for an identical group.

(2) Although the multiple classification conditions included in the table obtained from the RAM 13 are different from one another in the above exemplary embodiment, the table may include identical classification conditions that have different ranks. For example, a condition "expanded circumscribing rectangles overlap with one another" may be included twice, once with the rank "1" and once with the rank "2". FIGS. 10A and 10B show diagrams illustrating a process for generating a circumscribing rectangle and an expanded circumscribing rectangle for rendering elements classified into the same group. After a character string "Today's" has been classified into the same group as described above, and a circumscribing rectangle is further generated for that group, that circumscribing rectangle is, as shown in FIG. 10A, a rectangle of the minimum size that can circumscribe all of the rendering elements. In other words, a rectangle whose width is xw3, which is the overall width of the character string, and whose height is xh3, which is the overall height of the character string, is generated as the circumscribing rectangle. Then, an expanded circumscribing rectangle such as that shown in FIG. 10B is generated by expanding the circumscribing rectangle by a set percentage. For example, the width xw4 of the expanded circumscribing rectangle is calculated by multiplying the width xw3 of the circumscribing rectangle by a predetermined percentage, and the height xh4 of the expanded circumscribing rectangle is calculated by multiplying the height xh3 of the circumscribing rectangle by a predetermined percentage.

(3) Although the region in which a rendering element is rendered is represented as a circumscribing rectangle that circumscribes the rendering element in the above exemplary embodiment, the shape of the figure that circumscribes the rendering element is not limited to a rectangle. For example, the shape of the figure that circumscribes the rendering element may be a circle. FIGS. 11A and 11B show diagrams illustrating the representation of a region in which a rendering element is rendered, using a circumscribing circle. As shown in FIG. 11A, the CPU 11 generates, for a rendering element composed of the letter "a", a circumscribing circle Ra1 that circumscribes that rendering element. An expanded circumscribing circle Ra2 may then be generated by expanding the circumscribing circle Ra1 by a predetermined percentage (for example, 1.2) central to the center point P0 of the circumscribing circle Ra1, and it may then be determined whether or not to classify each rendering element into the same group based on this expanded circumscribing circle Ra2. In this case, for example, the diameter xd2 of the expanded circumscribing circle Ra2 is calculated by multiplying the diameter xd1 of the circumscribing circle Ra1 by a predetermined percentage. Furthermore, as shown in FIG. 11B, there are cases where the circumscribing circle that circumscribes the rendering element is not limited to a single circle. In such a case, where two circumscribing circles, or a circumscribing circle Ra1 and a circumscribing circle Rb1, are generated for a single rendering element, the region in which this rendering element is rendered may be represented by the sum of sets of these circumscribing circles or the product set of these circumscribing circles.

(4) Although in the exemplary embodiment, the information processing unit 1 was provided within the image forming apparatus 10, the information processing unit 1 may be realized by a personal computer.

Furthermore, although the units surrounded by the double-dot-dash line in FIG. 2 are functions implemented by the CPU 11 of the information processing unit 1, those units may be realized by an entity aside from the CPU 11. For example, these units may be implemented by a dedicated image processing processor.

(5) Although the CPU 11 performs vectorization without changing the rendering colors in the above exemplary embodiment, a process for reducing the rendering colors of the raster image data may be performed prior to the vectorization process. As an algorithm for this reduction process, the following steps S401 to S407, for example, are performed.

Step S401: a low-frequency color is merged with colors similar to that color but which also have a higher frequency than that color, based on a calculated histogram.

Step S402: the process ends if the number of composition colors is less than or equal to the target number of colors for the rendering colors.

Step S403: those colors are taken as a single color group, and the pair of colors with the highest color difference is obtained.

Step S404: the target group is divided into two with preference being given to color difference.

Step S405: the process ends if the number of groups is less than or equal to a target number of colors.

Step S406: the group having the maximum color difference pair is obtained from all the groups.

Step S407: the process returns to step S404.

(6) The classification conditions are not limited to those described above. FIG. 12 shows a diagram illustrating an example of classification conditions. There are two kinds of conditions shown in FIG. 12, or relative conditions and absolute conditions; "relative condition" refers to a condition that determines the attributes between two rendering elements, and this determination cannot be performed as long as those two rendering elements are not specified. However, "absolute condition" refers to a condition that is specified for each rendering element. For example, the condition "number of overlapping pixels in expanded circumscribing rectangle is no less than 5" is a relative condition, and whether or not that condition is met cannot be determined unless expanded circumscribing rectangles are generated and specified for those two rendering elements. However, whether or not the condition "expanded circumscribing rectangle is within a pre-divided region" is met can be determined, if the expanded circumscribing rectangle is specified for the single rendering element in question, by comparing the expanded circumscribing rectangle with a pre-divided region. In such a manner, absolute conditions can be used as classification conditions in addition to relative conditions.

(7) Furthermore, although classification conditions relating to distance and classification conditions relating to color are independent from one another in the above exemplary embodiment, those conditions may be dependent on one another. For example, the numerical values used in classification conditions relating to distance may fluctuate based on the color of the rendering element. To be more specific, a greater value may be used as the expansion percentage when generating an expanded circumscribing rectangle by expanding a circumscribing rectangle if a foreground color is a predetermined color (for example, black), than when the foreground color is a different color. Furthermore, the stated expansion percentage, thresholds, or the like may be determined based on functions determined according to the saturation or brightness of the foreground color, the contrast between the foreground color and the background color, or the like. In general, rendering elements rendered in black and rendering elements with a strong contrast relative to the background are highly likely to be text. Therefore, with this configuration, even if the distance between rendering elements that are rendered in black or rendering elements with a strong contrast relative to the background is greater than the distances between other rendering elements, adjustments can be made so as to handle the former rendering elements as text.

(8) Although the rendering elements classified by the classifying unit 115 are vectorized by the vector information generation unit 113 in the above exemplary embodiment, the classifying unit 115 may classify rendering elements that have not been vectorized. In sum, the classifying unit 115 may classify rendering elements, which are images surrounded by the border lines of colors in an image made up of concatenated pixels, into single or multiple groups based on whether or not each element fulfills a specified condition.

The foregoing description of the exemplary exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An image processing apparatus comprising:
a memory;
an obtaining unit that obtains image data showing an image including concatenated pixels;
an identifying unit that identifies a rendering element, the rendering element being an area surrounded by border lines of a color in the image shown by the image data;
a specifying unit that specifies a first condition from among a plurality of conditions for classifying the rendering element; and
a classifying unit that, in a case where a plurality of rendering elements has been identified by the identifying unit, classifies each rendering element that meets the first condition specified by the specifying unit into a single group or a plurality of groups, associates pieces of image data that show rendering elements belonging to one group with one another, and stores the pieces of image data in the memory, and classifies the rendering elements that belong to the groups and that meet a second condition that is different from the first condition specified by the specifying unit into a single group or a plurality of groups, associates pieces of image data that represent rendering elements belonging to one group with one another, and stores the pieces of image data in the memory,
wherein the plurality of conditions includes a condition regarding a distance between rendering elements within an image, and
wherein the value of the distance changes in response to a color of the rendering element or a contrast between a first color of the rendering element and a second color of a pixel that is adjacent to the rendering element,
wherein
in a case where the condition regarding the distance has been specified by the specifying unit, and the distance between two rendering elements is less than a threshold, the classifying unit classifies the two rendering elements into one group, and
the threshold changes in response to the color of the contrast.

2. An image processing apparatus comprising:
a memory;
an obtaining unit that obtains image data showing an image including concatenated pixels;
an identifying unit that identifies a rendering element, the rendering element being an area surrounded by border lines of a color in the image shown by the image data;
a specifying unit that specifies a first condition from among a plurality of conditions for classifying the rendering element; and
a classifying unit that, in a case where a plurality of rendering elements has been identified by the identifying unit, classifies each rendering element that meets the first condition specified by the specifying unit into a single group or a plurality of groups, associates pieces of image data that show rendering elements belonging to one group with one another, and stores the pieces of image data in the memory, and classifies the rendering elements that belong to the groups and that meet a second condition that is different from the first condition specified by the specifying unit into a single group or a plurality of groups, associates pieces of image data that represent rendering elements belonging to one group with one another, and stores the pieces of image data in the memory,
wherein the plurality of conditions includes a condition regarding a distance between rendering elements within an image, and
wherein the value of the distance changes in response to a color of the rendering element or a contrast between a first color of the rendering element and a second color of a pixel that is adjacent to the rendering element,
wherein
in a case where the condition regarding the distance has been specified by the specifying unit, the classifying unit expands the respective regions in which two rendering elements are rendered by a predetermined percentage or a predetermined size, and if the area of a portion in which the expanded regions overlap with one another is greater than a threshold, the classifying unit classifies the two rendering elements into one group, and
the percentage, the size, or the threshold change in response to the color of the contrast.

* * * * *